United States Patent
DeFelice et al.

(10) Patent No.: US 10,823,308 B1
(45) Date of Patent: Nov. 3, 2020

(54) CONTROLLERS FOR INLINE VALVES, INLINE VALVES, AND METHODS OF CONTROLLING FLOW THROUGH INLINE VALVES

(71) Applicant: Hamilton Sundstrand Corporation, Charlotte, NC (US)

(72) Inventors: Robert DeFelice, South Windsor, CT (US); Peter J. Dowd, Granby, CT (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/447,784

(22) Filed: Jun. 20, 2019

(51) Int. Cl.
*F16K 31/50* (2006.01)
*G05D 7/01* (2006.01)

(52) U.S. Cl.
CPC ........... *F16K 31/50* (2013.01); *G05D 7/0133* (2013.01); *Y10T 137/3367* (2015.04); *Y10T 137/3421* (2015.04); *Y10T 137/3476* (2015.04)

(58) Field of Classification Search
CPC ........ Y10T 137/3367; Y10T 137/3421; Y10T 137/3476; F04D 27/0215; F02C 6/08; F02C 9/18; F16K 31/50; F16K 1/126; F16K 31/1223; F16K 31/1226; G05D 7/0133; G05D 7/0146
See application file for complete search history.

(56) References Cited

U.S. PATENT DOCUMENTS

| 1,362,331 | A | * | 12/1920 | Larner | ............... F16K 1/126 137/219 |
|---|---|---|---|---|---|
| 1,387,446 | A | * | 8/1921 | Astier | ............... F16K 1/12 137/219 |
| 1,441,784 | A | * | 1/1923 | Clayton | ............... F16K 1/12 137/330 |
| 1,448,717 | A | * | 3/1923 | Slattery | ............... F16K 1/126 137/219 |

(Continued)

FOREIGN PATENT DOCUMENTS

| EP | 0376115 A1 | 7/1990 |
|---|---|---|
| EP | 3056739 A1 | 8/2016 |

OTHER PUBLICATIONS

European Search Report for Application No. 19212863.5-1015; dated Jul. 8, 2020, 9 pages.

*Primary Examiner* — Marina A Tietjen
*Assistant Examiner* — Frederick D Soski
(74) *Attorney, Agent, or Firm* — Cantor Colburn LLP

(57) ABSTRACT

A controller for an inline valve includes a manifold seating a set screw and has a reference fluid port, a control fluid port, and an actuator fluid port. A selector is movable within the manifold between a first position and a second position, the reference fluid port in fluid communication with the actuator fluid port in the first position, the control fluid port in fluid communication with the actuator fluid port in the second position. A biasing member is arranged between the selector and the set screw and urges the selector towards the first position. The set screw extends through an exterior of the (Continued)

manifold for adjustment of differential in pressures at the reference fluid port and the control fluid port responsive to which the selector moves between the first position and the second position. Inline valves and methods of controlling fluid flow through inline valves are also described.

19 Claims, 5 Drawing Sheets

(56) References Cited

U.S. PATENT DOCUMENTS

| | | | | |
|---|---|---|---|---|
| 1,723,736 A * | 8/1929 | Kruse | F16K 1/126 | 137/220 |
| 1,777,060 A * | 9/1930 | Welcker | F16K 1/126 | 137/220 |
| 1,824,916 A * | 9/1931 | Moody | F16K 1/126 | 137/219 |
| 1,829,703 A * | 10/1931 | Larner | F16K 1/126 | 137/219 |
| 1,838,723 A * | 12/1931 | Rudolph | F16K 1/12 | 137/220 |
| 1,841,608 A * | 1/1932 | Kruse | F16K 17/32 | 137/220 |
| 1,842,146 A * | 1/1932 | Clifford | F16K 1/12 | 137/219 |
| 1,856,222 A * | 5/1932 | McClellan | F16K 1/126 | 137/220 |
| 1,941,357 A * | 12/1933 | Kruse | F16K 1/126 | 137/220 |
| 2,085,893 A * | 7/1937 | Boland | F16K 1/126 | 137/219 |
| 2,095,410 A * | 10/1937 | Diescher | F16K 1/12 | 137/220 |
| 2,133,983 A * | 10/1938 | Gaston | F16K 1/12 | 137/219 |
| 2,269,671 A * | 1/1942 | Kinzie | F03C 2/08 | 137/219 |
| 2,442,625 A * | 6/1948 | Thomas | F16K 1/12 | 137/219 |
| 2,608,204 A * | 8/1952 | Dunn | F16K 7/075 | 137/220 |
| 2,914,079 A * | 11/1959 | Hertrich | B04B 9/06 | 137/219 |
| 2,919,714 A * | 1/1960 | Mrazek | F16K 1/126 | 137/220 |
| 2,931,378 A * | 4/1960 | Davies | F16K 24/04 | 137/220 |
| 2,938,533 A * | 5/1960 | Jensen | F16K 1/126 | 137/219 |
| 2,943,636 A * | 7/1960 | Reed | E03B 9/04 | 137/220 |
| 2,950,732 A * | 8/1960 | Lambert | G05D 16/106 | 137/219 |
| 2,996,074 A * | 8/1961 | Page | F16K 31/363 | 137/220 |
| 3,003,516 A * | 10/1961 | Granberg | G01F 15/005 | 137/220 |
| 3,074,685 A * | 1/1963 | Eckert | F16K 47/00 | 251/77 |
| 3,076,471 A * | 2/1963 | Salerno | G05D 7/014 | 137/219 |
| 3,092,132 A * | 6/1963 | Guy | F16K 1/12 | 137/219 |
| 3,092,133 A * | 6/1963 | Clark | F16K 1/126 | 137/220 |
| 3,119,405 A * | 1/1964 | Guy | F16K 1/126 | 137/219 |
| 3,134,394 A * | 5/1964 | Tsunetaro Ohta | F16K 15/06 | 137/220 |
| 3,155,108 A * | 11/1964 | Kahn | B64D 13/02 | 137/220 |
| 3,156,253 A * | 11/1964 | Marderness | F16K 1/126 | 137/220 |
| 3,172,420 A * | 3/1965 | Brown | F16K 1/126 | 137/219 |
| 3,177,889 A * | 4/1965 | Hardison | F16K 31/34 | 137/220 |
| 3,192,940 A * | 7/1965 | Wiersholm | G05D 7/03 | 137/220 |
| 3,194,255 A * | 7/1965 | Flaton | F16K 15/06 | 137/220 |
| 3,297,047 A * | 1/1967 | Sime | F16K 1/126 | 137/220 |
| 3,338,259 A * | 8/1967 | Tribe | F16K 1/126 | 137/220 |
| 3,359,998 A * | 12/1967 | Fike | F16K 1/126 | 137/220 |
| 3,380,469 A * | 4/1968 | Salerno | F16K 31/42 | 137/219 |
| 3,399,689 A * | 9/1968 | Keane | F16K 1/126 | 137/220 |
| 3,489,165 A * | 1/1970 | Salerno | G05D 16/166 | 137/220 |
| 3,490,484 A * | 1/1970 | Runton | F16K 1/126 | 137/219 |
| 3,534,769 A * | 10/1970 | Leveque | F16K 31/36 | 137/501 |
| 3,566,907 A * | 3/1971 | Sime | F16K 1/126 | 137/219 |
| 3,583,440 A * | 6/1971 | Andersson | F16K 31/1223 | 137/624.14 |
| 3,586,033 A * | 6/1971 | Hieber | B64D 39/06 | 137/220 |
| 3,617,151 A * | 11/1971 | Scroggins | F16K 1/126 | 417/18 |
| 3,643,685 A * | 2/1972 | Hays | F16K 1/126 | 137/501 |
| 3,643,707 A * | 2/1972 | Ensign | B67D 7/28 | 141/286 |
| 3,792,713 A * | 2/1974 | Zadoo | F16K 1/126 | 137/486 |
| 3,792,716 A * | 2/1974 | Sime | F16K 1/126 | 137/492 |
| 3,825,026 A * | 7/1974 | Salerno | F01D 17/145 | 137/219 |
| 3,865,128 A * | 2/1975 | Zadoo | F16K 1/126 | 137/220 |
| 3,901,266 A * | 8/1975 | Guy | G05D 7/0153 | 137/219 |
| 3,945,393 A * | 3/1976 | Teatini | F16K 1/126 | 137/220 |
| 3,963,044 A * | 6/1976 | Brown | F16K 31/363 | 137/490 |
| 3,987,812 A * | 10/1976 | Nelson | F16K 1/12 | 137/219 |
| 3,993,093 A * | 11/1976 | Mokveld | F16J 15/062 | 137/484.6 |
| 4,052,035 A * | 10/1977 | Kenny | B05B 1/302 | 251/14 |
| 4,077,425 A * | 3/1978 | Drori | F16K 31/363 | 137/219 |
| 4,094,334 A * | 6/1978 | Taylor | E21B 34/10 | 137/219 |
| 4,221,234 A * | 9/1980 | Kruschik | F16L 55/10 | 137/219 |
| 4,226,259 A * | 10/1980 | Szekely | F16K 31/365 | 137/269 |
| 4,285,495 A * | 8/1981 | King | F16K 1/126 | 137/219 |
| 4,373,544 A * | 2/1983 | Goodman | F04D 27/0215 | 137/220 |
| 4,429,709 A * | 2/1984 | Niskanen | G05D 7/03 | 137/220 |
| 4,479,507 A * | 10/1984 | Nichols | B67D 7/301 | 137/219 |
| 4,565,210 A * | 1/1986 | Heine | F16K 1/12 | 137/219 |

(56) References Cited

U.S. PATENT DOCUMENTS

| | | | | |
|---|---|---|---|---|
| 4,577,654 | A * | 3/1986 | Pringle | F16K 1/126 137/219 |
| 4,610,265 | A * | 9/1986 | Nelson | F16K 1/126 137/219 |
| 4,693,268 | A * | 9/1987 | Fahl | F16K 1/12 137/219 |
| 4,732,189 | A * | 3/1988 | Jones | F16K 31/1223 137/220 |
| 4,911,196 | A * | 3/1990 | Kemp | F16K 15/026 137/220 |
| 5,005,602 | A * | 4/1991 | Fahl | F16K 1/12 137/219 |
| 5,249,599 | A * | 10/1993 | Haynes | G05D 7/0133 137/501 |
| 5,441,171 | A * | 8/1995 | Maury | B65D 88/703 222/3 |
| 5,540,252 | A * | 7/1996 | Bruun | G05D 7/0146 137/220 |
| 5,603,352 | A * | 2/1997 | Tavor | F16K 1/126 137/594 |
| 5,803,356 | A * | 9/1998 | Babinger | F01P 11/16 137/219 |
| 5,826,613 | A * | 10/1998 | Schalk | F16K 1/123 137/219 |
| 5,921,276 | A * | 7/1999 | Lam | F16K 15/026 137/220 |
| 6,029,691 | A * | 2/2000 | Tavor | F16K 1/12 137/219 |
| 6,216,721 | B1 * | 4/2001 | Perez | F16K 1/126 137/219 |
| 6,230,734 | B1 * | 5/2001 | Grebnev | F16K 1/123 137/220 |
| 6,446,657 | B1 * | 9/2002 | Dziorny | F01D 17/105 137/219 |
| 7,878,181 | B2 | 2/2011 | Carns | |
| 8,656,941 | B1 * | 2/2014 | Hayward | F02K 9/58 137/221 |
| 9,033,306 | B2 * | 5/2015 | Kunau | B60C 25/145 141/38 |
| 9,080,832 | B2 * | 7/2015 | Brahler, II | F41H 13/0006 |
| 10,253,901 | B1 * | 4/2019 | Champaigne | F16K 27/048 |
| 2002/0005217 | A1 * | 1/2002 | Lyons | G05D 7/014 137/220 |
| 2006/0054848 | A1 * | 3/2006 | Vogt | F02B 37/16 251/77 |
| 2007/0284002 | A1 * | 12/2007 | Hartman | F16K 3/265 137/219 |
| 2008/0224076 | A1 * | 9/2008 | Jennings | F16K 7/20 251/122 |
| 2009/0250123 | A1 * | 10/2009 | Matsubara | F16K 27/0209 137/528 |
| 2009/0272929 | A1 * | 11/2009 | Bey | F16K 1/126 251/324 |
| 2010/0102259 | A1 * | 4/2010 | Forster | F16K 31/0651 251/129.01 |
| 2010/0187462 | A1 * | 7/2010 | Davies, Jr. | F16K 1/12 251/318 |
| 2012/0061595 | A1 * | 3/2012 | Canjuga | F16K 1/126 251/62 |
| 2012/0090715 | A1 * | 4/2012 | Fenwick | F16K 31/50 137/801 |
| 2014/0124059 | A1 * | 5/2014 | McAuliffe | F16K 31/12 137/492 |
| 2015/0008348 | A1 * | 1/2015 | Greene | F16K 31/383 251/62 |
| 2016/0376913 | A1 * | 12/2016 | Marocchini | F04D 27/0223 137/511 |
| 2017/0342853 | A1 * | 11/2017 | Schwalm | F02C 6/08 |
| 2017/0363003 | A1 * | 12/2017 | Evetts | F02C 7/18 |
| 2017/0370488 | A1 * | 12/2017 | Reinholdt | G05D 16/103 |
| 2018/0073648 | A1 * | 3/2018 | Wong | F16K 1/126 |
| 2020/0041005 | A1 * | 2/2020 | Baumann | F16K 1/38 |
| 2020/0095944 | A1 * | 3/2020 | Goodman | F16K 31/1223 |

* cited by examiner

CONTROLLERS FOR INLINE VALVES, INLINE VALVES, AND METHODS OF CONTROLLING FLOW THROUGH INLINE VALVES

STATEMENT OF FEDERAL SUPPORT

This invention was made with Government support under Contract No. FA8626-16-C-2139 awarded by the United States Air Force. The Government has certain rights in the invention.

BACKGROUND

The present disclosure generally relates to fluid systems, and more particularly to controlling fluid flow in fluid systems with inline valves.

Valves, such as bleed valves, are commonly used to control bleed flows in gas turbine engines, generally by signaling the bleed valve to open when it is necessary to vent the gas turbine engine compressor and by signaling the bleed valve to close when it is no longer necessary to vent the gas turbine engine compressor. The signal to open/close the valve can be provided by a remote controller. Such venting can be necessary, for example, during engine starting, where opening the bleed valve limits the energy required to rotate the compressor. In some bleed valves actuate according the pneumatic pressure provided to the bleed valve. The pressure required to actuate the bleed valve is generally a function of the bleed valve setup, which is established prior to installation of the bleed valve and which may be adjusted as required when the bleed valve is removed from engine during service.

Such systems and methods have generally been acceptable for their intended purpose. However, there remains a need in the art for improved controllers, inline valves, and methods of controlling inline valves. The present disclosure provides a solution to this need.

BRIEF DESCRIPTION

According to one embodiment, a controller for an inline valve is provided. The controller includes a manifold seating a set screw and having a reference fluid port, a control fluid port, and an actuator fluid port; a selector movable within the manifold between a first position and a second position, the reference fluid port in fluid communication with the actuator fluid port in the first position, the control fluid port in fluid communication with the actuator fluid port in the second position; and a biasing member arranged between the selector and the set screw, the biasing member urging the selector towards the first position. The set screw extends through an exterior of the manifold for adjustment of differential in pressures at the reference fluid port and the control fluid port responsive to which the selector moves between the first position and the second position.

In addition to one or more of the features described above, or as an alternative, further embodiments may include that the manifold has a set screw port in communication with the reference fluid port, the control fluid port, and the actuator fluid port, a threaded segment of the set screw threadably disposed within the set screw port.

In addition to one or more of the features described above, or as an alternative, further embodiments may include that the set screw has a tool engagement feature adjacent to the threaded segment, the tool engagement feature disposed on an exterior of the manifold.

In addition to one or more of the features described above, or as an alternative, further embodiments may include that the set screw has a smooth segment adjacent to the threaded segment, the smooth segment rotatably received within the biasing member.

In addition to one or more of the features described above, or as an alternative, further embodiments may include a plunger supported within the manifold, the plunger coupling the biasing member to the selector.

In addition to one or more of the features described above, or as an alternative, further embodiments may include that the plunger has a selector face opposing the selector, wherein the selector face is tangent to the selector.

In addition to one or more of the features described above, or as an alternative, further embodiments may include that the plunger has a plunger flange portion extending circumferentially about the plunger, wherein the biasing member is seated on the plunger flange portion.

In addition to one or more of the features described above, or as an alternative, further embodiments may include a set screw seat member supported within the manifold, the set screw seat member arranged between the biasing member and the set screw.

In addition to one or more of the features described above, or as an alternative, further embodiments may include that the set screw seat member has a seat member flange portion, wherein the biasing member is seated on the seat member flange portion.

In addition to one or more of the features described above, or as an alternative, further embodiments may include that the set screw seat member has a set screw socket opposite the biasing member, the set screw slidably received in the set screw socket.

In addition to one or more of the features described above, or as an alternative, further embodiments may include that the manifold has a fluid channel connecting the set screw with the reference fluid port, the control fluid port, and the actuator fluid port.

In addition to one or more of the features described above, or as an alternative, further embodiments may include a first selector seat fixed within the fluid channel between the control fluid port and the actuator fluid port; and a second selector seat fixed within the fluid channel between the first selector seat and the set screw, wherein the selector is disposed between the first selector seat and the second selector seat, the biasing member arranged between the second selector seat and the set screw.

In addition to one or more of the features described above, or as an alternative, further embodiments may include a pneumatic conduit fixed to the actuator fluid port; and a valve body having an exterior and an actuator chamber, the actuator chamber connected to the pneumatic conduit, wherein the manifold is fixed to the exterior of the valve body.

In addition to one or more of the features described above, or as an alternative, further embodiments may include that the manifold has a mount portion, and further comprising a valve body with an exterior, the mount portion connecting the manifold to the valve body.

According to another embodiment, an inline valve is provided. The inline valve includes a controller as described above, the manifold having a mount portion; a valve body with an exterior, an inlet, and an outlet, wherein the mount portion of the manifold connects the controller to the exterior of the valve body; and a poppet supported within the valve body and operably associated with the selector, wherein the poppet is movable between an actuator poppet seat and valve body poppet seat within the valve body, the inlet of the valve body in fluid communication with the outlet of the valve body when the poppet is against the actuator poppet seat, the poppet fluidly separating the inlet from the outlet when the poppet is against the valve body poppet seat.

In addition to one or more of the features described above, or as an alternative, further embodiments may include that the set screw has a tool engagement feature, wherein the tool engagement feature is located outside of the controller and the valve body.

In addition to one or more of the features described above, or as an alternative, further embodiments may include that the set screw has a threaded segment, the threaded segment threadably disposed within the manifold, the controller further including a plunger supported within the manifold, the plunger coupling the biasing member to the selector; and a set screw seat member supported within the manifold between the biasing member and the set screw port.

According to another embodiment, a gas turbine engine is provided. The gas turbine engine includes a compressor having a bleed port and a stage downstream of the bleed port; a controller as described above, the stage downstream of the of the bleed port in fluid communication with the control fluid port of the manifold; and an inline valve with a valve body with an inlet and an outlet, wherein the inlet is in fluid communication with the bleed port of the compressor, wherein the controller is mounted to an exterior of the valve body.

In addition to one or more of the features described above, or as an alternative, further embodiments may include that the reference fluid port of the manifold is in fluid communication with the external environment to communicate pressure of the external environment to the inline valve.

According to a further embodiments, a method of controlling flow through an inline valve is provided. The method includes, at an inline valve as described above, adjusting differential in pressures at the reference fluid port and the control fluid port responsive to which the selector moves between the first position and the second position. Adjusting includes advancing the set screw toward an exterior of the manifold or retracting the set screw from the exterior of the manifold.

Technical effects of the present disclosure include the capability to provide passive control of inline valves without remotely-mounted, active control mechanisms such as solenoids. In embodiments described herein no external signals are required for active control of the inline valve. Technical effects also include valve bodies having relatively large flow area in comparison to inline valves having controllers located within the valve body of the inline valve. Technical effects additionally include in-situ adjustability, inline valve controllers described herein allowing the pressure differential at which the inline valve opens to be adjusted without removing the inline valve from the fluid system.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
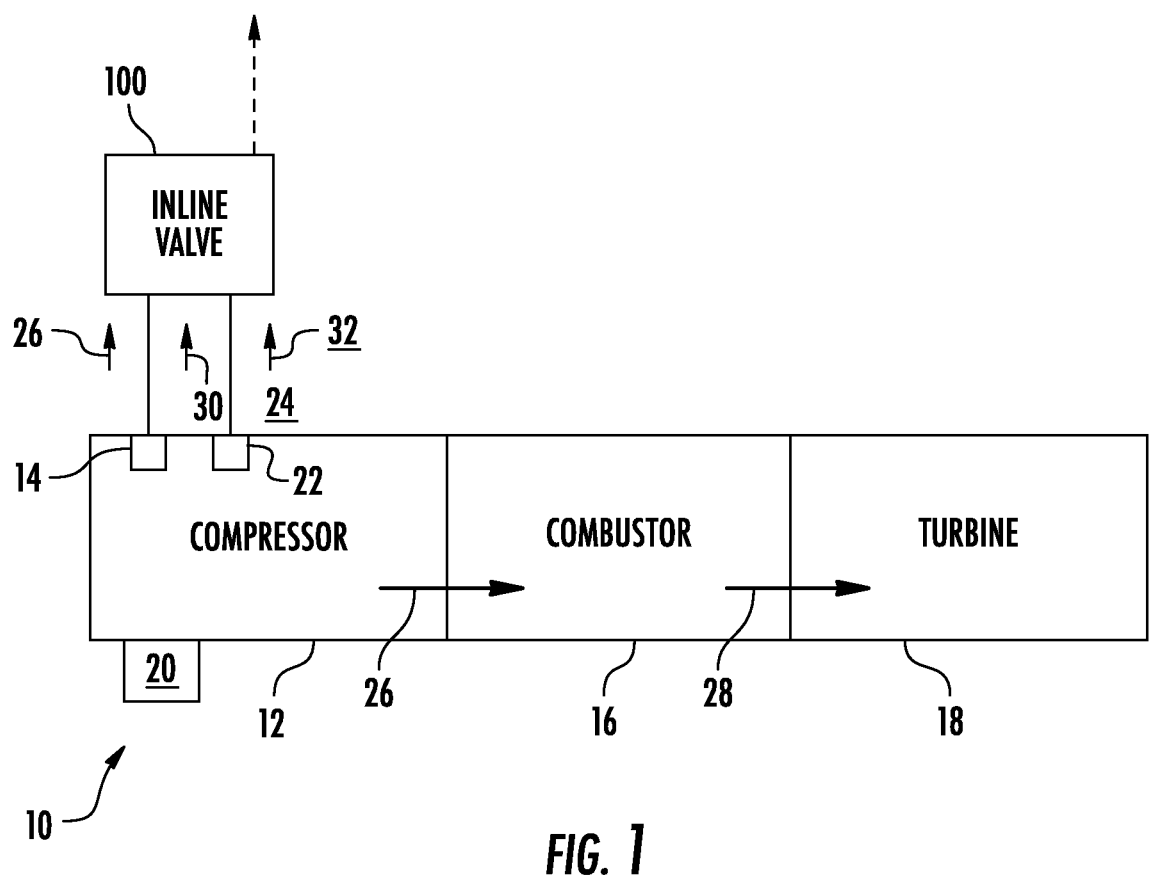
FIG. 1 is a schematic view of an inline valve constructed in accordance with the present disclosure, showing gas turbine engine compressor having a bleed port with the inline valve connected to the bleed port.

Reference will now be made to the drawings wherein like reference numerals identify similar structural features or aspects of the subject disclosure. For purposes of explanation and illustration, and not limitation, a partial view of an exemplary embodiment of a controller for an inline valve in accordance with the disclosure is shown in FIG. 1 and is designated generally by reference character 100. Other embodiments of controllers, inline valves, gas turbine engines and methods of controlling flow through inline valves in accordance with the present disclosure, or aspects thereof, are provided in FIGS. 2-6, as will be described. The systems and methods described herein can be used for pneumatically controlling passively actuated inline valves, such as bleed valves in gas turbine engines, though the present disclosure is not limited to controlling bleed flows in gas turbine engines or to gas turbine engines in general.

Referring to FIG. 1, a gas turbine engine 10 is shown. The gas turbine engine 10 includes a compressor 12 with a bleed port 14, a combustor 16, and a turbine 18. The gas turbine engine 10 also includes a starter 20, a fan 22, and the inline valve 100.

The compressor 12 is arranged to ingest and compress fluid (e.g., air) from the external environment 24 to generate a working fluid flow 26. The combustor 16 is in fluid communication with the compressor 12 to the working fluid flow 26 and is arranged to generate therefrom a flow of high pressure combustion products 28. The turbine 18 is in fluid communication with the combustor 16 to extract energy from the flow of high pressure combustion products 28 for both powering the compressor 12 and the fan 22.

The starter 20 is operably connected to the gas turbine engine 10 for starting the gas turbine engine 10. More specifically, the starter 20 is arranged to provide mechanical rotation to the compressor 12 during startup of the gas turbine engine 10 when power is unavailable from the turbine 18. To limit the power required during startup the inline valve 100 is connected to the bleed port 14. In this respect the inline valve 100 is arranged to provide fluid communication between the compressor 12 and the external environment 24 according to pressure within the compressor 12, as will be described.

The inline valve 100 receives the working fluid flow 26, a control fluid flow 30, and a reference fluid flow 32. The control fluid flow 30 has a pressure that is greater than that of the working fluid flow 26, e.g., as the control fluid flow 32 is obtained from a stage downstream of the bleed port 14, to provide muscles pressure for actuation of the inline valve 100.) The working fluid flow 26 in turn has pressure that is greater than that of the reference fluid flow 32. As shown and described herein the working fluid flow 26 is received from the bleed port 14, the control fluid flow 30 is received from the compressor 12, e.g., from a compressor stage downstream of the bleed port 14, and the reference fluid flow 32 is received from the external environment 24. It is understood that this is for illustration purposes only and is non-limiting, and that other arrangements are possible and remain within the scope of the present disclosure.

Figure 2:
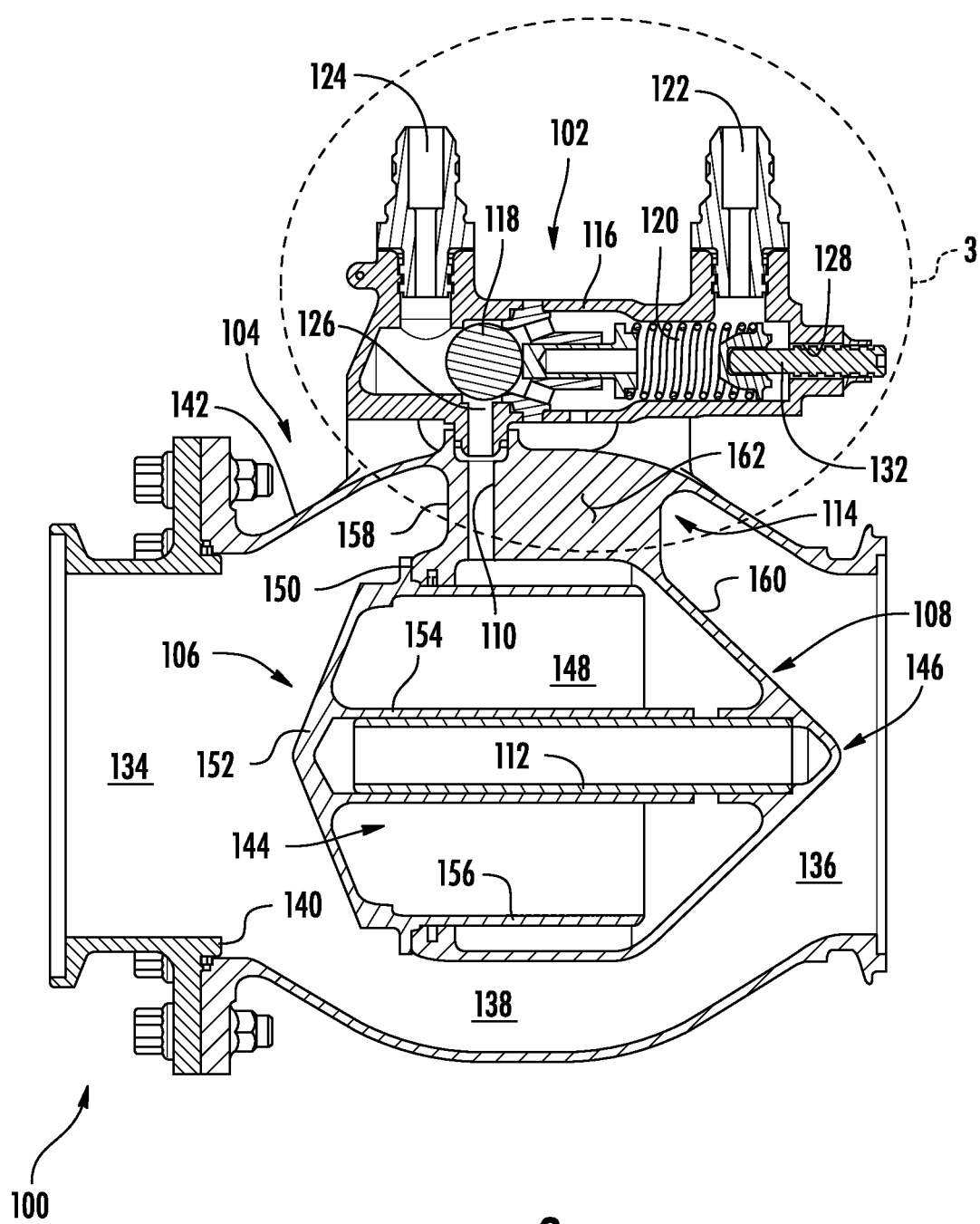
FIG. 2 is cross-sectional view of the inline valve of FIG. 1, showing a valve body with a poppet and an externally mounted controller for remotely communicating either a pressure of reference fluid or pressure of control fluid to the poppet.

With reference to FIG. 2, an embodiment of the inline valve 100 is shown. The illustrated inline valve 100 includes a controller 102, valve body 104, and a poppet 106. The inline valve 100 also includes an actuator 108, a pneumatic conduit 110, a guide 112, and a fairing 114.

The controller 102 generally includes a manifold 116, a selector 118, and a biasing member 120. The manifold 116 has a reference fluid port 122, a control fluid port 124, an actuator fluid port 126, and a set screw port 128. The selector 118 is supported within the manifold 116 and is movable between a first position 130 (shown in FIG. 4) and a second position 132 (shown in FIG. 5). When the selector 118 is in the first position 130 the reference fluid port 122 is in fluid communication with the actuator fluid port 126. When the selector 118 is in the second position 132 the control fluid port 124 is in fluid communication with the actuator fluid port 126. The biasing member 120 is arranged between the selector 118 and a set screw 133. The set screw 133 is threadedly seated in the set screw port 128 for controlling in-situ differential between pressures at the reference fluid port 122 and the control fluid port 124, responsive to which the selector 118 moves between the first position 130 and the second position 132.

The valve body 104 has an inlet 134, an outlet 136, and an interior 138. The valve body 104 also has a valve body poppet seat 140 and an exterior 142. The poppet 106, the actuator 108, the guide 112, and the fairing 114 are arranged within the interior 138 of the valve body 104. The controller 102 is connected to the exterior 142 of the valve body 104. The pneumatic conduit 110 connects the actuator 108 to the controller 102. The pneumatic conduit 110 extends through the exterior 142 of the valve body 104 and seats in the actuator fluid port 126 of the controller 102 in one embodiment The actuator 108 has an open end 144, a closed end 146, and defines an actuator chamber 148 and an actuator poppet seat 150. The closed end 146 of the actuator 108 opposes the outlet 136 of the valve body 104. The open end 144 of the actuator 108 opposes the inlet 134 of the valve body 104. The actuator poppet seat 150 extends about the open end 144 of the actuator 108. The guide 112 is fixed to the actuator 108 within the actuator chamber 148. The poppet 106 is slidably received within the actuator 108 and on the guide 112, the poppet 106 and the actuator 108 thereby bounding the actuator chamber 148. The pneumatic conduit 110 is fixed to the actuator 108 and provides fluid communication between the controller 102 and the actuator chamber 148.

The poppet 106 has a face portion 152, a guide portion 154, and a skirt portion 156. The face portion 152 opposes the inlet 134 of the valve body 104. The guide portion 154 of the poppet 106 extends from the face portion 152 towards the outlet 136 of the valve body 104 and is slidably received on the guide 112. The skirt portion 156 of the poppet 106 extends from the face portion 152 of the poppet 106 at a location radially outward of the guide portion 154 of the poppet 106, extends towards the outlet 136 of the valve body 104, and is slidably received within the actuator 108.

The fairing 114 extends about the pneumatic conduit 110 and couples the actuator 108 to the valve body 104. In this respect the fairing 114 has a leading edge 158, a trailing edge 160, and a fairing body 162. The leading edge 158 of the fairing 114 opposes the inlet 134 of the valve body 104 and extends between an interior surface 164 of the valve body 104 and the actuator 108. The trailing edge 160 of the fairing 114 extends between the interior surface 164 of the valve body 104 and the actuator 108 at a location downstream of the leading edge 158 of the fairing 114, and opposes the outlet 136 of the valve body 104. The fairing body 162 extends between the leading edge 158 and the trailing edge 160 of the fairing 114.

Figure 3:
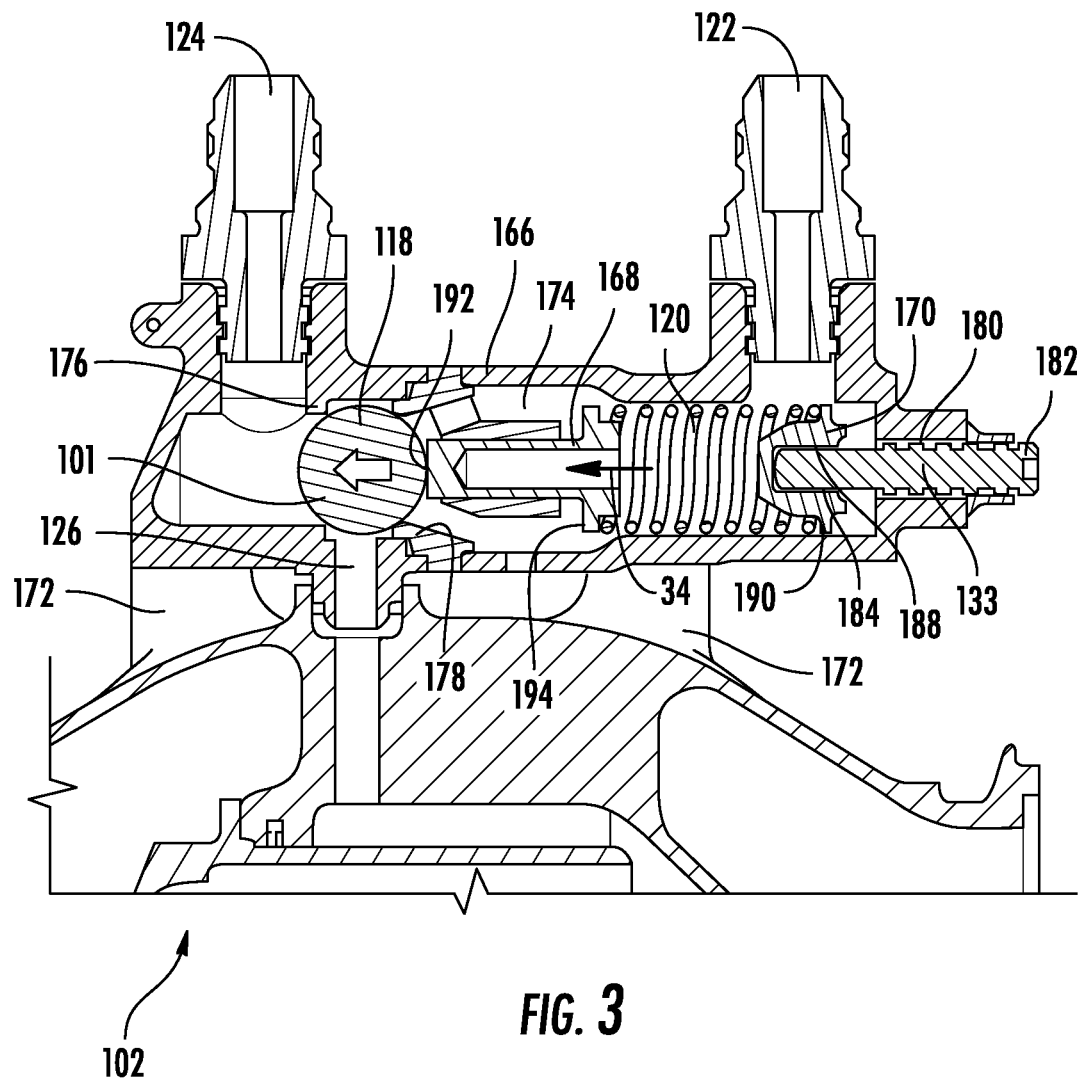
FIG. 3 is a cross-sectional view of a portion of the inline valve of FIG. 1 including the controller, showing a biasing member arranged between a selector and a set screw for controlling pressure communicated to the poppet according to differential in pressures at the controller reference fluid port and control fluid port.

With reference to FIG. 3, the controller 102 is shown in greater detail. The controller 102 includes a manifold 166, the selector 118, and a plunger 168. The controller also includes the biasing member 120, a set screw seat member 170, and the set screw 133.

The manifold 166 has a mount portion 172 and a fluid channel 174. The mount portion 172 connects the manifold 166 to the valve body 104. More specifically, the mount portion 172 extends between the manifold 166 the exterior 142 of the valve body 104 such that the controller 102 and the valve body 104 form a unitary assembly of the inline valve 100. The fluid channel 174 connects the set screw port 128 with the reference fluid port 122, the control fluid port 124, and the actuator fluid port 126.

A first selector seat 176 and a second selector seat 178 are fixed within the fluid channel 174. More specifically, the first selector seat 176 is fixed within the fluid channel 174 between control fluid port 124 and the actuator fluid port 126. The second selector seat 178 is fixed within the fluid channel 174 between the first selector seat 176 and the set screw port 128. The selector 118, the plunger 168, the biasing member 120, and the set screw seat member 170 are each arranged within the fluid channel 174. In this respect the selector 118 is disposed between the first selector seat 176 and the second selector seat 178, the plunger 168 is disposed between the selector 118 and the biasing member 120, and the set screw seat member 170 is disposed between the set screw 133 and the set screw seat member 170.

The set screw 133 has a threaded segment 180, a tool engagement feature 182, and a smooth segment 184. The threaded segment 180 is threadably disposed within the set screw seat member 170. The tool engagement feature 182 is adjacent to the threaded segment 180, e.g., on a side of the threaded segment 180 opposite the set screw seat member 170, and is disposed on an exterior 186 of the manifold 166. The smooth segment 184 is adjacent to the threaded segment 180, e.g., on a side of the threaded segment 180 opposite the tool engagement feature 182 and within the fluid channel 174, and is rotatably received within the set screw seat member 170.

The set screw seat member 170 is supported within the manifold 166 between the biasing member 120 and the set screw port 128, defines a set screw socket 188, and has a seat member flange portion 190. The set screw socket 188 is defined on a side of the set screw seat member 170 opposite the biasing member 120 and the set screw 133 is slidably received within the set screw socket 188. More specifically, the smooth segment 184 of the set screw 133 is slidably received within the set screw socket 188 for rotation relative to the set screw seat member 170. The seat member flange portion 190 extends about the set screw seat member 170 and biasing member 120, e.g., an end of the biasing member opposite the plunger 168, is seated of the seat member flange portion 190.

The plunger 168 is supported within the manifold 166 and couples the biasing member 120 to the selector 118. In this respect the plunger 168 has a selector face 192 and a plunger flange portion 194. The plunger flange portion 194 extends circumferentially about the plunger 168 and the biasing member 120, e.g., at an end of the biasing member 120 opposite set screw seat member 170, and is seated on the plunger flange portion 194. The selector face 192 opposes the selector 118 and is tangent to the selector 118. In this respect it is contemplated that the selector 118 have a spherical shape. In certain embodiments the selector 118 can additionally have a ceramic coating 101, such as a silicon nitride coating by way of non-limiting example.

The biasing member 120 is compressively supported between the selector 118 and the set screw 133. In this respect the biasing member 120 urges the selector 118 towards the first selector seat 176 with a biasing force 34. The biasing force 34 in turn has a magnitude that depends, at least in part, upon the advancement (or retraction) of the set screw 133 within the set screw port 128. As will be appreciated by those of skill in the art in view of the present disclosure, advancing the set screw 133 within the set screw port 128 increases magnitude of the biasing force 34. Increase of the biasing force 34 in turn increases the pressure differential required across the control fluid port 124 and the reference fluid port 122 required to move the selector 118 from the first position 130 (shown in FIG. 4) to the second position 132 (shown in FIG. 5). Oppositely, retracting the set screw 133 from the set screw port 128 reduces the magnitude of the biasing force 34 and reduces the pressure differential required across the control fluid port 124 and the reference fluid port 122 required to move the selector 118 from the first position 130 to the second position 132. As will also be appreciated by those of skill in the art in view of the present disclosure, as the tool engagement feature 182 is located outside of the controller 102 and the valve body 104, the pressure differential can be adjusted with the inline valve in-situ, e.g., while installed in the gas turbine engine 10 (shown in FIG. 1), simplifying installation and service of the inline valve 100 and the gas turbine engine 10.

Figure 4:
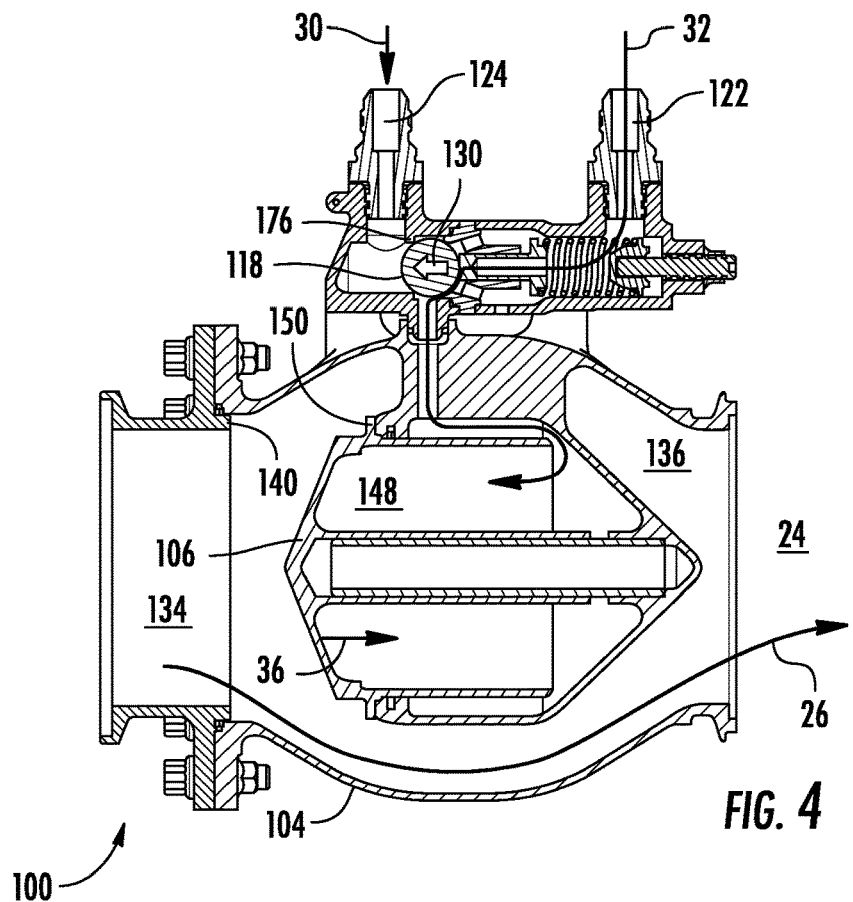
FIG. 4 is a cross-sectional view of the inline valve of FIG. 1, showing the selector in a first position and the controller thereby communicating pressure at the reference fluid port to the poppet.

With reference to FIG. 4, the inline valve 100 is shown with the selector 118 in the first position 130. The selector 118 moves to the first position 130 when the sum of the biasing force 34 and force exerted on the selector 118 by the reference fluid flow 32 exceeds that of force exerted on the selector 118 by the control fluid flow 30. When this condition exists the selector 118 moves to the first position 130, wherein the selector 118 abuts the first selector seat 176. Abutment of the selector 118 with the first selector seat 176 places the reference fluid port 122 in fluid communication with the actuator chamber 148. Fluid communication between the reference fluid port 122 and the actuator chamber 148 pressurizes the actuator chamber 148 according to the pressure of the reference fluid flow 32.

When pressure of the working fluid flow 26 reaches pressure sufficient to overcome pressure of the reference fluid flow 32 within the actuator chamber 148 the inline valve 100 passively opens, i.e., the poppet 106 moves 36 from the valve body poppet seat 140 to the actuator poppet seat 150. Once the poppet 106 is against the actuator poppet seat 150 the inlet 134 of the valve body 104 is in fluid communication with the outlet 136 of the valve body 104, the compressor 12 (shown in FIG. 1) thereby being in fluid communication with the external environment 24 through the valve body 104. The compressor 12 is thereby able to increase pressure of the working fluid flow 26 without having to fully pressurize the working fluid flow 26 due to the venting provided by the inline valve 100, reducing the input energy required to start the gas turbine engine 10 (shown in FIG. 1).

Figure 5:
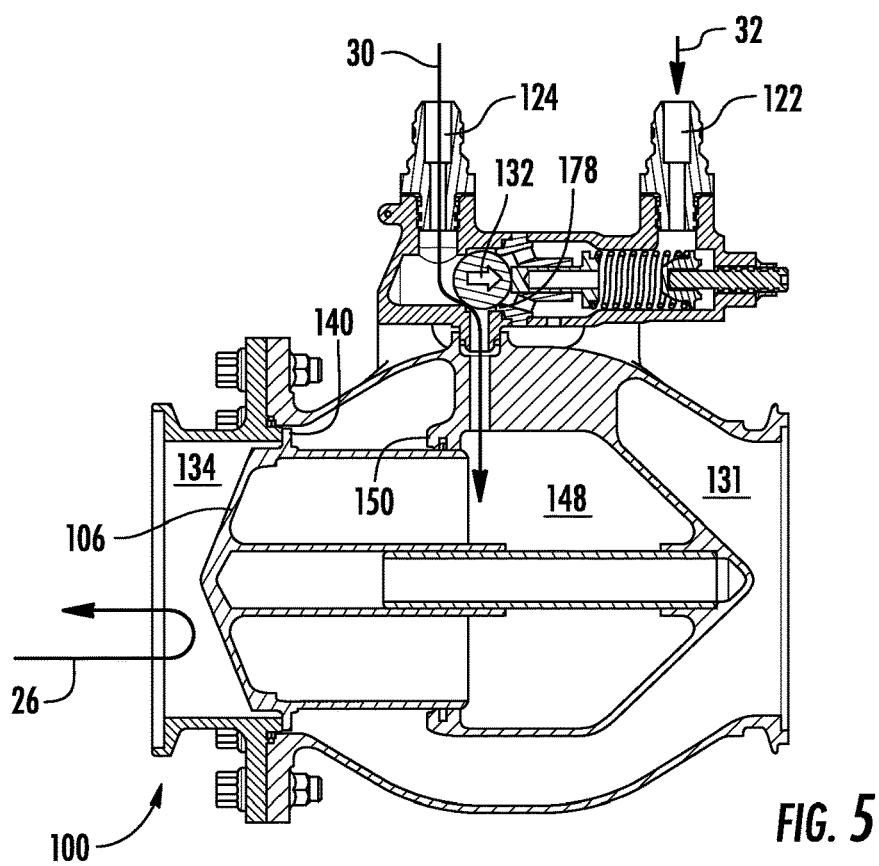
FIG. 5 is a cross-sectional view of the inline valve of FIG. 1, showing the selector in a second position and the controller thereby communicating pressure at the control fluid port to the poppet.

With reference to FIG. 5, the inline valve 100 is shown with the selector 118 in the second position 132. The selector 118 moves to the second position 132 when the sum of the biasing force 34 and force exerted on the selector 118 by the reference fluid flow 32 falls below the force exerted on the selector 118 by the control fluid flow 30. When this condition exists the selector 118 moves to the second position 132, wherein the selector 118 abuts the second selector seat 178. Abutment of the selector 118 with the second selector seat 178 places the control fluid port 124 in fluid communication with the actuator chamber 148. Fluid communication between the control fluid port 124 and the actuator chamber 148 pressurizes the actuator chamber 148 according to the pressure of the control fluid flow 30.

When pressure of the control fluid flow 30 reaches pressure sufficient to overcome force exerted on the poppet 106 by the working fluid flow 26 the inline valve 100 passively closes, i.e., the poppet 106 moves 38 from the actuator poppet seat 150 and against the valve body poppet seat 140. Once against the valve body poppet seat 140 the poppet 106 fluidly separates the outlet 136 of the valve body 104 from the inlet 134 of the valve body 104. This ceases fluid communication between the compressor 12 (shown in FIG. 1) and the external environment 24 through the inline valve 100.

Figure 6:
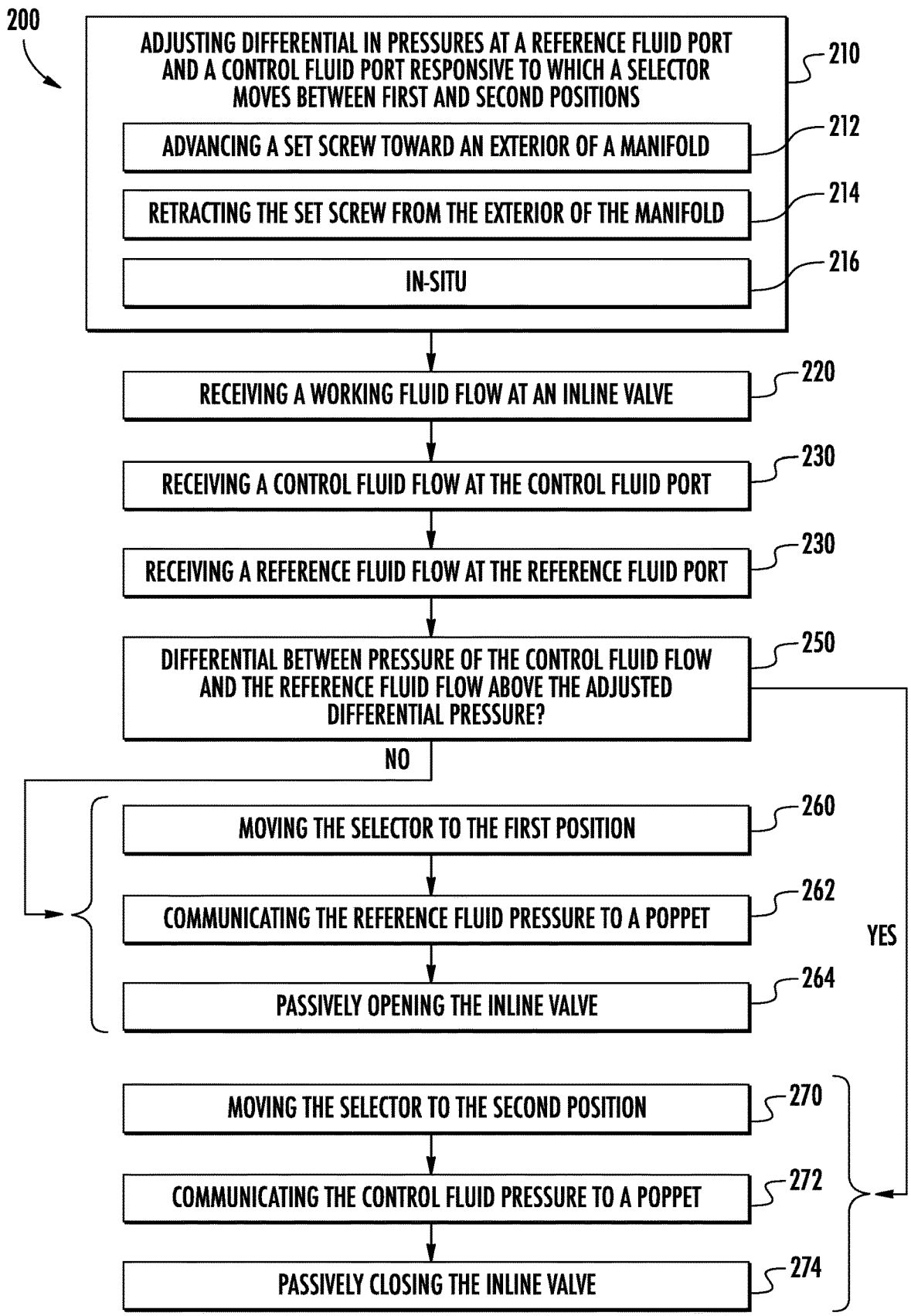
FIG. 6 is a block diagram of a method of controlling fluid flow through an inline valve, showing steps of the method according to an illustrative and non-limiting embodiment of the method.

With reference to FIG. 6, a method 200 of controlling flow through an inline valve, e.g., the inline valve 100, is shown. As shown with box 210, the method 200 generally includes adjusting differential in pressures at a reference fluid port, e.g., the reference fluid port 122 (shown in FIG. 2), and a control fluid port, e.g., the control fluid port 124 (shown in FIG. 2) responsive to which a selector, e.g., the selector 118 (shown in FIG. 2) moves between a first position, e.g., the first position 130 (shown in FIG. 4), and a second position, e.g., the second position 132 (shown in FIG. 5). The adjustment can be made by advancing a set screw, e.g., the set screw 132 (shown in FIG. 2) toward an exterior of the manifold, e.g., the manifold 116 (shown in FIG. 2), as shown with box 212. The adjustment can be made by retracting the set screw from the exterior of the manifold, as shown with box 214. It is contemplated that the adjustment be done in-situ, e.g., without removing the inline valve 100, from a bleed port of a gas turbine engine, e.g., the bleed port 14 (shown in FIG. 1), as shown with box 216.

As shown with box 220 a working fluid flow, e.g., the working fluid flow 26, is received at a poppet of the inline valve, e.g., the poppet 106. A control fluid flow, e.g., the control fluid flow 30 (shown in FIG. 1), and a reference fluid flow, e.g., the reference fluid flow 32 (shown in FIG. 1), are received at the controller, as shown with box 230 and box 240.

When differential between pressure of the control fluid flow and the reference fluid flow falls below the set pressure differential the selector moves to the first selector position, as shown by box 260. Movement of the selector to the first selector position communicates the reference fluid pressure to the poppet, as shown by box 262, and the inline valve passively opens when force on the poppet associated with the working fluid flow is sufficient to overcome force on the poppet associated with the reference fluid flow, as shown with box 264.

When the differential between the pressure of the control fluid flow and the reference fluid flow rises above set pressure differential the selector moves to the second selector position, as shown by box 270. Movement of the selector to the second selector position communicates the control fluid pressure to the poppet, as shown by box 272, and the inline valve passively closes when force on the poppet associated with the control fluid flow is sufficient to overcome force on the poppet associated with the working fluid flow, as shown with box 274.

Inline valves can be operated by pneumatic controllers to control the flow of muscle pressure flow to the inline valve actuation chamber. This can be done, for example, using remotely mounted solenoid to apply and remove the muscle pressure from the inline valve responsive to an electronic signal provided to the inline valve. Once the controller applies the muscle pressure to the inline valve the muscle pressure can actuate the valve according to the trip pressure setting of the inline valve.

In embodiments described herein inline valves are provided that operate passively and according to a controller mounted to the inline valve exterior. It is contemplated that inline valves described herein have trip points that are adjustable, the trip point setting determining the condition present at the inlet of the inline valve, the outlet of the inline valve, and the control fluid port and reference fluid port of the controller. In certain embodiments the controller includes a spring-loaded ball, which responds to pressure differential between the controller control fluid port and reference fluid port to select whether the reference fluid pressure or the control fluid is delivered to an actuation chamber within the inline valve.

When the spring force is larger than force on the ball from the differential in pressures at the control fluid port and the reference fluid port, the controller communicates the reference pressure to the inline valve actuation chamber. When the spring force is smaller than the force on the ball from the differential in pressures at the control fluid port and the reference fluid port, the controller communicates the control fluid pressure to the actuation chamber. So long as pressure at the inline valve inlet is between the controller inlet and controller outlet, the piston position is driven solely by the position of the controller ball—the amount of spring force on the ball thus controlling the pressure at which the inline valve actuate. Further, as the spring force adjustable without disassembling the controller, the trip point of the valve can be adjusted between missions. Further, the inline valve can be tuned in-situ and according to the requirements of the fluid system in which the inline valve is incorporated. The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An inline valve assembly comprising:
   an inline valve; and
   a controller comprising:
   a manifold seating a set screw and having a reference fluid port, a control fluid port, and an actuator fluid port; and
   a selector movable within the manifold between a first position and a second position, the reference fluid port in fluid communication with the actuator fluid port in the first position, the control fluid port in fluid communication with the actuator fluid port in the second position; and
   a biasing member arranged between the selector and the set screw, the biasing member urging the selector towards the first position; and
   a first selector seat fixed within a fluid channel between the control fluid port and the actuator fluid port; and
   a second selector seat fixed within the fluid channel between the first selector seat and the set screw, wherein the selector is disposed between the first selector seat and the second selector seat; and
   wherein the set screw extends through an exterior of the manifold for adjustment of differential in pressures at the reference fluid port and the control fluid port responsive to which the selector moves between the first position and the second position; and
   wherein the control port is directly fluidly connected to a compressor.

2. The inline valve assembly as recited in claim 1, wherein the manifold has a set screw port in communication with the reference fluid port, the control fluid port, and the actuator fluid port, a threaded segment of the set screw threadably disposed within the set screw port.

3. The inline valve assembly as recited in claim 2, wherein the set screw has a tool engagement feature adjacent to the threaded segment, the tool engagement feature disposed on an exterior of the manifold.

4. The inline valve assembly as recited in claim 2, wherein the set screw has a smooth segment adjacent to the threaded segment, the smooth segment rotatably received within the biasing member.

5. The inline valve assembly as recited in claim 1, further comprising a plunger supported within the manifold, the plunger coupling the biasing member to the selector.

6. The inline valve assembly as recited in claim 5, wherein the plunger has a selector face opposing the selector, wherein the selector face is tangent to the selector.

7. The inline valve assembly as recited in claim 5, wherein the plunger has a plunger flange portion extending circumferentially about the plunger, wherein the biasing member is seated on the plunger flange portion.

8. The inline valve assembly as recited in claim 1, further comprising a set screw seat member supported within the manifold, the set screw seat member arranged between the biasing member and the set screw.

9. The inline valve assembly as recited in claim 8, wherein the set screw seat member has a seat member flange portion, wherein the biasing member is seated on the seat member flange portion.

10. The inline valve assembly as recited in claim 8, wherein the set screw seat member has a set screw socket opposite the biasing member, the set screw slidably received in the set screw socket.

11. The inline valve assembly as recited in claim 1, wherein the manifold has a fluid channel connecting the set screw with the reference fluid port, the control fluid port, and the actuator fluid port.

12. The inline valve assembly as recited in claim 11 wherein the biasing member is arranged between the second selector seat and the set screw.

13. The inline valve assembly as recited in claim 11, further comprising:
a pneumatic conduit fixed to the actuator fluid port; and
a valve body having an exterior and an actuator chamber, the actuator chamber connected to the pneumatic conduit, wherein the manifold is fixed to the exterior of the valve body.

14. The inline valve assembly as recited in claim 1, wherein the manifold has a mount portion, and further comprising a valve body with an exterior, the mount portion connecting the manifold to the valve body.

15. The inline valve assembly of claim 1, comprising:
a controller as recited in claim 1, wherein the manifold has a mount portion;
a valve body with an exterior, an inlet, and an outlet, wherein the mount portion of the manifold connects the controller to the exterior of the valve body; and
a poppet supported within the valve body and operably associated with the selector, wherein the poppet is movable between an actuator poppet seat and valve body poppet seat within the valve body, the inlet of the valve body in fluid communication with the outlet of the valve body when the poppet is against the actuator poppet seat, the poppet fluidly separating the inlet from the outlet when the poppet is against the valve body poppet seat.

16. The inline valve as recited in claim 15, wherein the set screw has a tool engagement feature, wherein the tool engagement feature is located outside of the controller and the valve body.

17. The inline valve as recited in claim 15, wherein the set screw has a threaded segment, the threaded segment threadably disposed within the manifold, the controller further comprising;
a plunger supported within the manifold, the plunger coupling the biasing member to the selector; and
a set screw seat member supported within the manifold between the biasing member and the set screw port.

18. A gas turbine engine, comprising:
a compressor having a bleed port and a stage downstream of the bleed port;
a controller comprising:
a manifold seating a set screw and having a reference fluid port, a control fluid port, and an actuator fluid port;
a selector movable within the manifold between a first position and a second position, the reference fluid port in fluid communication with the actuator fluid port in the first position, the control fluid port in fluid communication with the actuator fluid port in the second position;
a biasing member arranged between the selector and the set screw, the biasing member urging the selector towards the first position;
a first selector seat fixed within the fluid channel between the control fluid port and the actuator fluid port; and
a second selector seat fixed within the fluid channel between the first selector seat and the set screw, wherein the selector is disposed between the first selector seat and the second selector seat;
wherein the set screw extends through an exterior of the manifold for adjustment of differential in pressures at the reference fluid port and the control fluid port responsive to which the selector moves between the first position and the second position;
wherein the stage downstream of the bleed port is in fluid communication with the control fluid port of the manifold; and
an inline valve with a valve body with an inlet and an outlet, wherein the inlet is in fluid communication with the bleed port of the compressor, wherein the controller is mounted to an exterior of the valve body.

19. The gas turbine engine as recited in claim 18, wherein the reference fluid port of the manifold is in fluid communication with the external environment to communicate pressure of the external environment to the inline valve.

* * * * *